April 30, 1946.  F. G. NEGUS  2,399,289
APPARATUS FOR PURIFYING LIQUIDS
Filed Oct. 26, 1943

INVENTOR
Frank Gates Negus
BY
Emery, Varney, Whittemore & Dix
ATTORNEYS

Patented Apr. 30, 1946

2,399,289

UNITED STATES PATENT OFFICE 2,399,289

APPARATUS FOR PURIFYING LIQUIDS

Frank Gaies Negus, Halifax, Nova Scotia, Canada, assignor to Aqua-Electric Corporation, Ltd., Halifax, Nova Scotia, Canada, a corporation of Nova Scotia Application October 26, 1943, Serial No. 507,636
In Canada June 15, 1940

1 Claim. (Cl. 204—275)

This invention relates to apparatus for purifying water, and pertains particularly to apparatus in which the purifying action is electrical.

In such apparatus spaced electrodes are provided by means of which the electric current is applied to the water to be purified. It is an object of the present invention to provide improved electrodes, particularly with respect to the manner of flowing the water to be purified between said electrodes; and to provide improved means for adjusting and cleaning such electrodes.

Other objects and advantages of the invention will appear hereinafter.

A preferred embodiment of the invention selected for purposes of illustration is shown in the accompanying drawing, in which, Figure 1 is a vertical longitudinal section through the apparatus.

Figure 1:
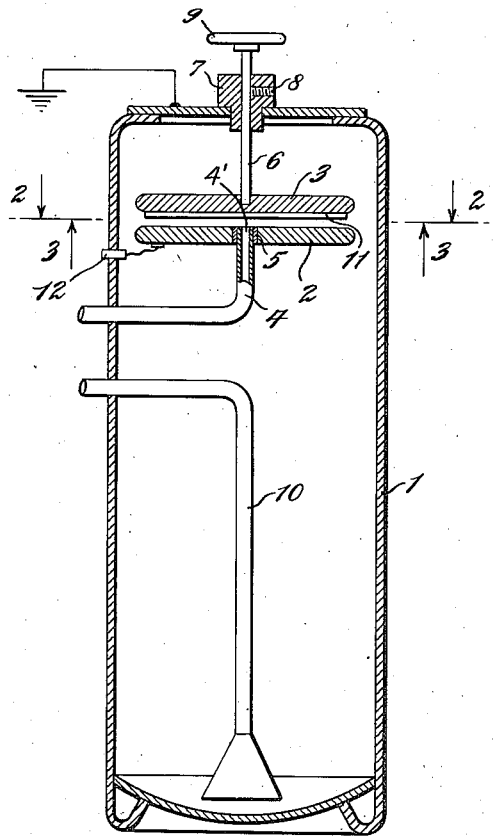
Figure 2:
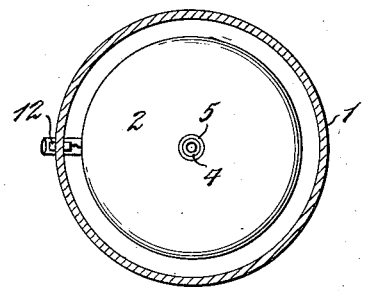
Figure 2 is a section on the line 2—2 of Figure 1.
Figure 3:
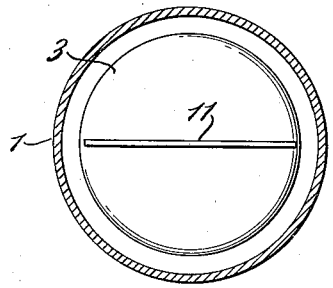
Figure 3 is a section on the line 3—3 of Figure 1.

This application is a continuation in part of my copending application Serial No. 279,271, filed June 15, 1939.

Referring to the drawing, the apparatus is illustrated as embodied in a vertical cylindrical tank 1 of a type adapted for use in homes, hotels, factories, hospitals and the like where purified water is desirable.

A pair of imperforate spaced plate electrodes 2 and 3 are mounted inside said tank, said electrodes being immersed in the water in the tank during operation. The electrode 2 is stationary and may be supported in any suitable manner, as by mounting it on the inlet pipe 4, from which it is insulated in any suitable manner, as by a collar 5 of suitable insulating material. The electrode 3 is adjustable, being mounted on a spindle 6 which extends through a bushing 7 in the top of the tank. The said bushing contains a packing 8 fitting snugly around the spindle, but permitting longitudinal movement of the spindle or rotating movement of the spindle. The upper end of the spindle is provided with a hand wheel 9 by means of which the spindle and electrode may be manipulated as hereinafter set forth.

An outlet pipe 10 is provided which may extend to a point near the bottom of the tank as illustrated, in order that a filter bed may be placed in the bottom of the tank so that the sludge precipitated by the electrolytic action may be filtered out.

The electrodes 2 and 3 may be made of any suitable material such as steel, although when treating water without the use of coagulating chemicals, I prefer to use aluminum for the positive electrode as the release of aluminum hydroxide resulting from the electrolytic action has a coagulating effect on the impurities in the water. The electrodes are disk shaped with opposed parallel flat electrode surfaces, and, as shown, the inlet pipe 4 extends through the center of the electrode 2 to provide an inlet port 4' which discharges against the center of the electrode 3 so that the inflowing water is deflected to flow radially outwardly between the electrodes in all directions from the center. This insures that the water is subjected to uniform treatment as it moves radially outward between the electrodes. Furthermore, the outward movement not only carries away coagulated impurities as the coagulum is formed between the electrodes, but also tends to loosen and carry away any coating of slime which may tend to collect on the electrode surfaces. This is also true as to any air or gas bubbles which may tend to form and collect on the electrode surfaces. The opposed parallel surfaces of said electrodes terminate in rim surfaces which turn upwardly and downwardly away from the space between the respective parallel flat electrode surfaces so as to avoid impeding the free discharge of liquid and dislodged impurities from the space between the electrodes. Because of the uniform radially outward flow from the center, and because of the shape of the electrode surfaces, as above described, such discharge of coagulated impurities, slime and air or gas bubbles is uniform and there is no tendency for such materials to collect in any localized space between the electrodes. However, in some cases, particularly after long periods of use, a more or less uniform coating of slime may be formed on the positive electrode which it may be desirable to remove from time to time. For this purpose the negative electrode may have mounted on its surface a blade 11 of insulating material such as vulcanized fiber. In the operation of the apparatus, when it is desired to clean the surface, the adjustable electrode is brought close to the stationary electrode by manipulation of the hand wheel, and by then turning the hand wheel, the accumulated slime is scraped from the positive electrode surface. After cleaning, the electrode is again adjusted to proper operating distance, and the loosened slime will be carried away by the inflowing water.

Ordinarily the stationary electrode 2 is the positive electrode, being connected to a source of electricity by a wire passing through an insulated bushing 12 in the wall of the tank. The electrode 3 and the tank itself is grounded in any suitable manner.

It will be understood that any suitable vessel may be employed to contain the water to be purified by the action of the immersed electrodes, the tank illustrated being merely one form of such a vessel.

It will be understood that the invention may be variously modified and embodied within the scope of the subjoined claim.

I claim as my invention:

A water purifier comprising, in combination, a vessel containing water to be purified, a pair of oppositely disposed imperforate plate electrodes immersed in the water in said vessel and having relatively closely spaced parallel surfaces, means for flowing water to be purified from the exterior of said vessel into the space between said electrodes, said means consisting of a conduit having an inlet port extending through the center of one of said electrodes and discharging against the center of the other electrode, whereby water is deflected to flow radially outwardly between said electrodes in all directions from the center to clear the space between the electrodes of coagulated impurities, one of said electrodes being mounted on a spindle extending through said vessel for manipulation from the outside, and means supporting said spindle to effect longitudinal and rotating movement thereof, one of said electrodes having a scraper blade of insulating material mounted on its surface and projecting toward the surface of the opposed electrode.

FRANK GAIES NEGUS.